United States Patent
Liberman (12)

(10) Patent No.: US 8,633,828 B2
(45) Date of Patent: Jan. 21, 2014

(54) SYSTEM AND METHOD FOR SAFING AND MONITORING A PLURALITY OF VEHICLE SENSORS

(75) Inventor: Maxim Liberman, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 321 days.

(21) Appl. No.: 13/019,050

(22) Filed: Feb. 1, 2011

(65) Prior Publication Data

US 2011/0187546 A1  Aug. 4, 2011

Related U.S. Application Data

(60) Provisional application No. 61/300,059, filed on Feb. 1, 2010.

(51) Int. Cl.
*G08B 21/00* (2006.01)

(52) U.S. Cl.
USPC ......... 340/669; 340/665; 340/436; 73/488; 73/510; 324/162; 701/301

(58) Field of Classification Search
USPC .................................................. 340/669
See application file for complete search history.

(56) References Cited

U.S. PATENT DOCUMENTS

| | | | | |
|---|---|---|---|---|
| 5,322,325 A | | 6/1994 | Breed et al. | 280/735 |
| 5,538,099 A | * | 7/1996 | Blackburn et al. | 180/282 |
| 6,487,482 B1 | | 11/2002 | Mattes et al. | 701/45 |
| 6,600,414 B2 | * | 7/2003 | Foo et al. | 340/440 |
| 7,231,803 B2 | | 6/2007 | Stuetzler | 73/12.01 |
| 7,779,689 B2 | | 8/2010 | Li et al. | 73/510 |
| 2004/0183291 A1 | | 9/2004 | Shimizu | 280/735 |
| 2009/0024284 A1 | | 1/2009 | Bourbiel et al. | 701/45 |
| 2009/0248326 A1 | * | 10/2009 | Greening | 702/56 |
| 2009/0326851 A1 | * | 12/2009 | Tanenhaus | 702/96 |
| 2010/0017066 A1 | * | 1/2010 | Lu et al. | 701/45 |

* cited by examiner

*Primary Examiner* — George Bugg
*Assistant Examiner* — Anthony D Afrifa-Kyei
(74) *Attorney, Agent, or Firm* — Sunstein Kann Murphy & Timbers LLP

(57) ABSTRACT

A system and method for safing vehicle sensors includes two safety systems, each with a primary sensor for monitoring vehicle motion and activating its corresponding safety system in response to certain vehicle motions. Each sensor may act as a safing sensor for the other in the event that activation of a safety system is indicated by the primary sensor. Each sensor may also monitor the other prior to such an event, to detect a sensor malfunction before that sensor is needed to active a safety system.

15 Claims, 5 Drawing Sheets

SYSTEM AND METHOD FOR SAFING AND MONITORING A PLURALITY OF VEHICLE SENSORS

PRIORITY

The present application claims priority to U.S. Provisional Patent Application Ser. No. 61/300,059, filed Feb. 1, 2010 in the name of Maxim Liberman, and entitled "System and Method for Safing a Vehicle Sensor", the full disclosure of which is hereby incorporated by reference herein.

TECHNICAL FIELD

The present invention relates to systems and methods employing coupled inertial sensors for activating a vehicle safety system, such as passenger restraint system, an airbag system, or a stability control system. In particular, this invention pertains to cross-coupling sensors to more effectively and efficiently control activation of a passenger restraint system or a stability control system.

BACKGROUND ART

The danger of personal injury in motor vehicle accidents can be substantially mitigated by the use of passive restraint systems, such as an airbag system, or other safety systems. These systems frequently include an inflatable balloon, called an airbag, which normally is stored away in a location such as a compartment within the vehicle steering wheel or within a side pillar. When the vehicle suffers an impact from a stationary object or another vehicle, the attendant rapid deceleration of the vehicle can be measured with sensors such as microelectromechanical ("MEMS") accelerometers. When the sensors indicate that deceleration thresholds have been exceeded, deployment of the airbag(s) is triggered. Airbag inflation at the proper time can often prevent substantial injury to passengers by restraining passenger movement in a crash. (As used herein, the term "passenger" will include a vehicle driver.)

Prevention of a false deployment of a passive restraint is as important as deploying the restraint at the proper time. An inflated airbag, for example, can interfere with a driver's ability to control the vehicle, thereby causing a crash. As a result, prior art passive restraint systems have frequently incorporated additional sensors called "safing" sensors. Restraints are activated only when both the safing sensor and the acceleration sensor indicate the need for passenger restraint. However, such redundancy is an undesirable additional expense. U.S. Pat. No. 6,487,482 discloses a system with two sensors that implement "reciprocal" plausibility checks.

SUMMARY OF EMBODIMENTS

A first embodiment provides a method of operating an airbag safety system and a second safety system on a vehicle. The airbag safety system is characterized by an airbag deployment threshold and includes an airbag, and a high-G accelerometer associated with the airbag deployment threshold. The high-G accelerometer is specified to measure at least about 20 Gs of acceleration. The second safety system is characterized by a second deployment threshold, and includes a low-G accelerometer associated with the second deployment threshold. The low-G accelerometer specified to measure not more than 20 Gs. The method includes monitoring the vehicle's motion with a first one of the accelerometers to determine whether that accelerometer's measurement exceeds its associated deployment threshold; monitoring the vehicle's motion with a second one of the accelerometers to determine whether that accelerometer's measurement exceeds an associated plausibility threshold; and determining whether to deploy at least one of the safety systems, determining being a function of the first accelerometer's measurement, the first accelerometer's deployment threshold, the second accelerometer's measurement, and the plausibility threshold.

In one embodiments, the first one of the accelerometers is the high-G accelerometer; the associated deployment threshold is the airbag deployment threshold; the second one of the accelerometers is the low-G accelerometer; and the at least one of the safety systems comprises the airbag system.

In another embodiment, the first one of the accelerometers is the low-G accelerometer; the associated deployment threshold is the second deployment threshold; the second one of the accelerometers is the high-G accelerometer; and the at least one of the safety systems comprises the second safety system.

Yet another embodiment includes monitoring the vehicle's motion with the low-G accelerometer to determine whether that accelerometer's measurement exceeds the second deployment threshold; monitoring the vehicle's motion with the high-G accelerometer to determine whether that accelerometer's measurement exceeds an associated second plausibility threshold; and determining whether to deploy a second one of the safety systems, in which determining is a function of the second accelerometer's measurement, the second accelerometer's deployment threshold, the first accelerometer's measurement, and the second plausibility threshold.

In various embodiments, the second safety system is a vehicle stability control system, or a braking system. In some embodiments, determining whether the accelerometer's measurement exceeds an associated plausibility threshold is performed after the determination that the first accelerometer's measurement exceeds its associated deployment threshold.

Another embodiment provides a vehicle control apparatus for use with an airbag safety system and a second safety system on a vehicle. The airbag safety system is characterized by an airbag deployment threshold, and includes an airbag and a high-G accelerometer associated with the airbag deployment threshold. The high-G accelerometer is specified to measure at least 20 Gs of acceleration. The second safety system is characterized by a second deployment threshold, and includes a low-G accelerometer associated with a second deployment threshold and specified to measure not more than 20 Gs. The airbag safety system has an associated airbag plausibility threshold, and the second safety system having an associated second plausibility threshold. The apparatus further includes an input for receiving 1) a first signal from a first one of the accelerometers, and 2) a second signal from a second one of the accelerometers, the first signal including information relating a measurement of the first one of the accelerometers ("first measurement"), the second signal including information relating a measurement of the second one of the accelerometers ("second measurement"), the input being one or plural physical inputs.

The apparatus also includes a comparison circuit configured to determine whether, using the first signal, the first measurement exceeds the deployment threshold of its associated accelerometer. The comparison circuit is configured to determine whether, using the second signal, the second measurement exceeds the plausibility threshold of its associated accelerometer, the comparison circuit producing a comparison signal including information relating to the determinations.

In addition, the apparatus includes a deployment module operably coupled with the comparison circuit, the deployment module configured to determine whether to deploy at least one of the safety systems, the deployment module determining whether to deploy as a function of the comparison signal.

In some embodiments, the first sensor is a high-G accelerometer and the second vehicle sensor is a low-G accelerometer, while in other embodiments the first sensor is a low-G acceleration sensor and the second vehicle sensor is a gyroscope.

In some embodiments, the first safety systems is of a passenger restraint system and the second safety system is a vehicle braking system.

Yet another embodiment provides a method of operating a first safety system having a first sensor output, and a second safety system having a second sensor having a second sensor output. The method includes determining whether the first sensor output exceeds a first monitoring threshold; determining whether the second sensor output exceeds a second monitoring threshold; and generating a warning signal if one of the first and second sensor outputs fails to exceed its respective monitoring threshold and the other of the first and second sensor outputs exceeds its respective monitoring threshold. In some embodiments, the first sensor is a high-G accelerometer, and the second sensor is a low-G accelerometer.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in the application, unless the context requires otherwise, "safing" a sensor will mean determining that the sensor is operating properly, or preventing an erroneous sensor output from activating a safety system when activation is not warranted. For example, a safing sensor may prevent the deployment of an automobile's airbag when the automobile has not been in a crash, even if the airbag sensor erroneously reports a crash.

Some embodiments reduce the cost for safing sensor systems in a motor vehicle safety control system. The method and system prevent the activation of a safety system, such as an automobile's airbag, due to an erroneous signal from a sensor. In another embodiment, two sensors monitor each other's behavior to detect possible malfunction before an accident or other event that would activate a safety system.

Figure 1:
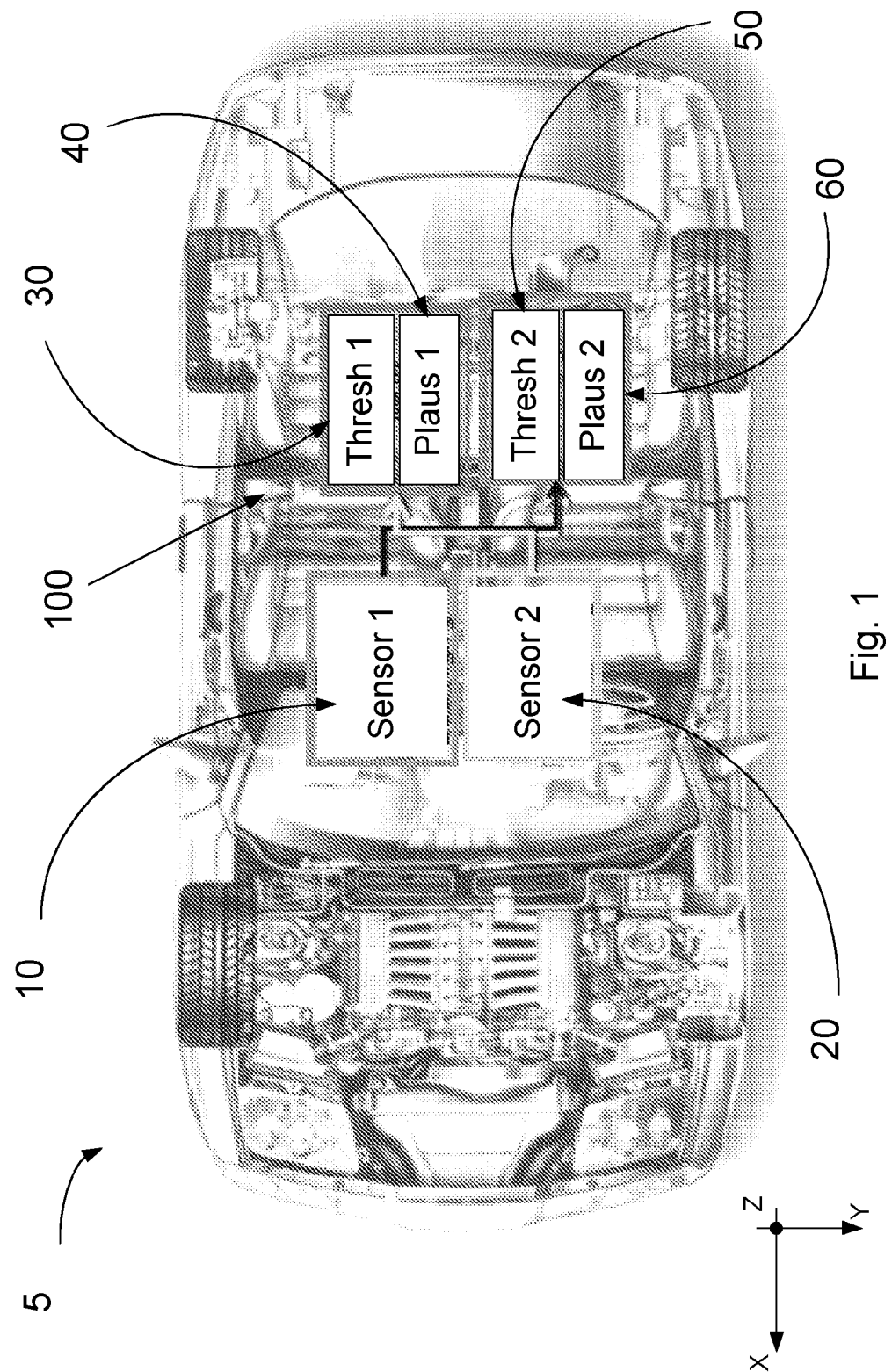
FIG. 1 schematically illustrates an automobile having a vehicle safety system decision making device.

In an embodiment of a safing system, at least two inertial sensors 10 and 20 are attached to a vehicle 5, as schematically illustrated in FIG. 1. The sensors may be accelerometers or gyroscopes, for example. The sensors may be implemented as MEMS or by any other technique known in the art. The sensors do not necessarily share the same substrate or generate the same response characteristic for a given vehicle motion. Indeed, in some embodiments the sensors may be on a common chip or integrated circuit.

In this embodiment, a first sensor, such as a high-G accelerometer 10 oriented in a front-back direction (X-axis), measures vehicle acceleration, while a second sensor 20, such as a low-G accelerometer oriented in a front-back direction, also measures vehicle acceleration. In alternate embodiments, two sensors 10 and 20 may be oriented to sense motion in different axes. For example, one sensor 10 may sense motion in a front-back direction, while the other 20 senses lateral motion (y-axis), or motion normal to front-back and lateral axes (i.e., the Z-axis). Other embodiments may orient sensor 10 and 20 to sense motion on a lateral axis and the Z-axis.

An evaluation circuit 100 determines whether the output from the first sensor 10 exceeds a threshold indicating the need to trigger or activate a safety system, such as an airbag. The evaluation circuit 100 uses the output of the second sensor 20 to determine plausibility of the first sensor's output. Plausibility, in this context, means that the second sensor (which may be known as a "safing" sensor) has also detected a vehicle motion corresponding in time to the vehicle motion detected by the first sensor (which may be known as a "primary" sensor).

The safing sensor does not need to produce a duplicate of the primary sensor's output, nor does it need to confirm the exact parameters of the motion detected by the first sensor. In fact, the evaluation circuit 100 may process the output of the safing sensor in a different way than it processes the output of the primary sensor. For example, an evaluation circuit may make a plausibility determination based on the amplitude of the safing sensor's output, its rate of change, or even the polarity of the acceleration being reported by the safing sensor, to name but a few examples.

Further, depending on how its output is evaluated by the evaluation circuit, or depending on how the sensor is employed as part of another safety system (e.g., as a primary sensor), a low-G safing sensor may have a different sensitivity (or "resolution") than the primary sensor. For example, the ADXL103 low-G accelerometer from Analog Devices, Inc. has a sensitivity of 1000 mV/G across its +/−1.7 G range, while the ADXL001 high-G accelerometer, also from Analog Devices, Inc., has a sensitivity of only 16 mV/G across its +/−70 range. Thus a 1 mV output from the ADXL001 accelerometer reports a much larger acceleration than a 1 mV output from the ADXL103 accelerometer. Some embodiments require that the low-G accelerometer have a minimum sensitivity. For example, some embodiments require that the low-G accelerometer have a minimum sensitivity of 25 mV/G, while others may require a minimum sensitivity of 50 mV/G or 100 mV/G, or 300 mV/G or 1000 mV/G, or at some point within a range defined by those points.

Therefore, in its most basic sense, the safing sensor merely confirms that it, too, felt something, thus implying that the first sensor's output is plausible. In other words, the safing sensor confirms that the motion reported by the primary sensor is within the realm of possibility, and unlikely to be an erroneous signal.

The evaluation circuit may monitor the safing sensor continuously, rather than only when the primary sensor has indicated a motion in excess of its threshold. In other embodiments, however, the evaluation circuit may only assess the safing sensor's output after the primary sensor has indicated a motion in excess of its threshold.

Returning to the embodiment of FIG. 1, the first sensor 10 acts as a "primary" sensor, and the second sensor 20 acts as a "safing" sensor in this embodiment. Only when the first sensor's measurement exceeds the threshold and the second sensor's measurement indicates the first sensor's measurement is plausible is the airbag safety system triggered.

Likewise, in a corresponding manner, the evaluation circuit 100 determines when the output from the second sensor 20 exceeds a different threshold indicating the need to trigger a different safety system, such as a vehicle stability control ("VSC") system or braking system. The evaluation circuit 100 uses the output of the first sensor 10 to determine the plausibility of the second sensor's output. Only when the second sensor's measurement exceeds the threshold and the first sensor's measurement indicates the second sensor's measurement is plausible is the vehicle stability control triggered. This approach provides a dual use for each sensor: each sensor's output is used to signal the need to trigger a particular safety system and to safe the sensor for a different safety system. This dual use for each sensor can reduce the number of sensors needed for the vehicle, reducing costs. Some embodiments do not require both sensors to safe each other. For example, the first sensor may safe the second sensor, while the second sensor does not safe the first sensor.

In various embodiments, the first and second sensors 10 and 20 can be further insulated from single points of failure by powering the devices from different power circuits and/or locating the sensors in different packages or on different circuit boards. In some embodiments of the invention, a high-G accelerometer measures acceleration effectively in the range from about 20 Gs to 125 Gs, where "G" is a measure of acceleration (or its equivalent, deceleration) expressed in terms of multiples of the acceleration due to gravity. In some embodiments, a low-G accelerometer provides an effective output measurement for accelerations in the range from about 1.5 Gs to 14 Gs. Other ranges are possible, depending on the vehicle and how safety systems are applied in that vehicle. For example, a low-G accelerometer may have a specified range of anywhere from 1 G up to 3 G, or 15 G, 16 G, 17 G, 18 G, or 19 G, or any where in-between, for example. Some systems may include a low-G accelerometer with a specified range of only up to 2 G, or 3 G, or 5 G, for example. When specifying the sensitivity of an accelerometer in terms of G, it is understood that the specified parameter refers to the sensitivity or range of sensitivities specified by the device's manufacturer.

Conventional airbag systems include high-G accelerometers that have little or no sensitivity to low-G accelerations. Airbag system designers have historically chosen such accelerometers so that accelerations lower than those generated by a crash do not trigger airbag deployments. To the extent that an accelerometer in a conventional airbag system does sense low G accelerations, the accelerometer's output is damped or ignored by the system for the same reason. Thus, conventional wisdom indicates that a low-G acceleration signal from an airbag sensor responsible for detecting a crash are not useful, and indeed may be dangerous and are to be avoided.

The inventor has discovered that, contrary to conventional wisdom, such low-G signals from a sensor in an airbag system can, surprisingly, be useful. As such, in some embodiments, a high-G accelerometer may measure acceleration from zero to 70 Gs, or from −70 Gs to +70 Gs.

In addition, conventional prior art airbag safety systems known to the inventor use a high-G accelerometer for the primary sensor, and a second high-G accelerometer for the safing sensor. Safety system designers historically have believed that the safing sensor signal should confirm the primary sensor signal by producing an identical output for a given acceleration event. Identical sensor responses to an event makes it highly probable that both sensors are operating identically, and therefore properly. However, this has required that the system include a second high-G accelerometer, even if the only use for that second high-G accelerometer is as a safing sensor, or even as a primary sensor for another safety system. In other words, according to conventional wisdom, a system that does not have a second high-G accelerometer would be forced to include one for use as a safing sensor, even if the system already includes other sensors (e.g., a low-G accelerometer or a gyroscope, for example), adding cost and complexity to the system. Such complexity is preferably avoided because it introduces additional opportunities for system malfunction or failure.

The inventor has discovered that, contrary to conventional wisdom, a low-G accelerometer can provide a signal useful in a safing function, even if the a low-G accelerometer does not produce an identical signal to that of the high-G sensor in response to the same vehicle motion. The inventor has realized that the proper question is not whether the safing sensor produces a response identical to that of the primary sensor, but rather, whether the safing sensor produces a response sufficient to conclude that the output of the primary sensor is plausible. Thus, the system need not hold the safing sensor to the same high standard as the primary sensor. In other words, the safing sensor may produce an output that is different from that of the primary sensor in response to the same event, and yet be useful for a plausibility confirmation. In an extreme case, the vehicle motion or acceleration may exceed the specified range of a low-G accelerometer. Even in that case, however, the accelerometer may produce some output, even if that output is a maximum output (e.g., "at the rail"), or a signal to indicate that the accelerometer output has exceeded its specified maximum. Such an output may nevertheless be useful for purpose of safing another sensor.

Figure 2A:
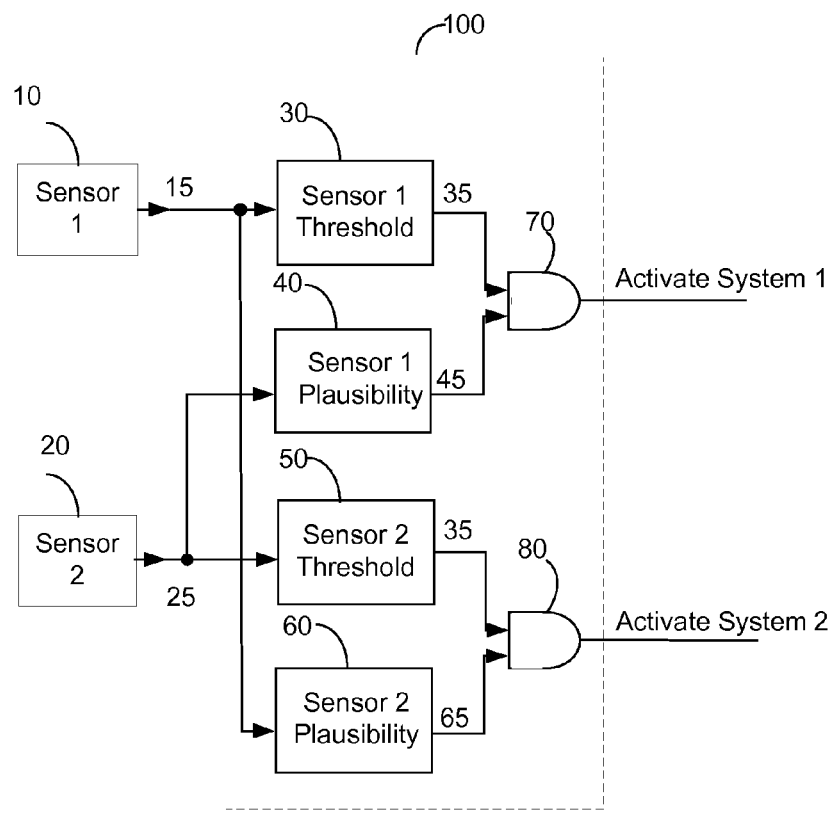
FIG. 2A is schematic diagram of an embodiment of a decision making device controlling two safety systems.

FIG. 2A is a schematic representation of a reduced cost, motor vehicle safety decision system 1, according to an embodiment of the invention, which includes the first sensor 10 and second sensor 20. The sensors are not implemented on the same substrate to eliminate a single point of failure. The sensors are inertial sensors, e.g. accelerometers or gyroscopes, etc. The sensors may be implemented as MEMS or by other inertial sensor technologies, as are known in the art, and may each be implemented with a different sensor technology or with the same technology. Each sensor provides a different response characteristic for vehicle motion. For example, the first sensor may be a high-G accelerometer and the second sensor may be a low-G accelerometer. In another embodiment, the first sensor is a low-G accelerometer and the second sensor is a gyroscope. Thus, the first sensor's measurement 15 may be useful for deciding to trigger an airbag while the second sensor may provide motion measurements 25 for a vehicle stability control ("VSC") system. While in this embodiment the sensors may be of different types, in other embodiments the sensors may be of the same type and differ in placement within the vehicle or differ in orientation.

An evaluation circuit 100 (which may be known as a "comparison circuit") activates a vehicle safety system according to the sensor measurements. One portion of the circuit 30 has a physical input for receiving the output 15 of the first sensor 10, and compares the output 15 of the first sensor 10 to a threshold and generates a signal 35 based on the comparison.

A threshold for an airbag system may be in the range of about 20 G or more, but will vary depending on the vehicle. The threshold will be determined by the safety system's designer, based on factors such as the size, shape and weight of the vehicle, as well as the materials from which the vehicle is constructed. These factors, as well as design features such as crumple zones for example, will effect the motion of the vehicle in a crash, and thus will effect the forces or accelerations sensed by a safety system's sensor(s). Accordingly, the precise thresholds used for a given safety system cannot be known without additional information about the vehicle itself. Also, the particular algorithms used by vehicle designers to determine whether a threshold has been met, are proprietary to each vehicle manufacturer.

A second portion 40 of the circuit 100 has a second physical input for receiving the output 25 of the second sensor 20, and determines the plausibility of the first sensor's output using the output 25 of the second sensor, and then generates a plausibility signal 45. A signal to activate the first safety system, such as an airbag passive restraint, is generated by the evaluation circuit 100 only if the both the threshold signal 35 and the plausibility signal 45 are active simultaneously.

Likewise, another portion 50 of the circuit compares the output 25 of the second sensor 20 to a second threshold and generates a signal 55 based on the comparison. A further portion 60 of the circuit determines the plausibility of the second sensor's output using the output 15 of the first sensor, and then generates a plausibility signal 65. A signal to activate the second safety system, such as anti-skid braking, is generated only if the both the threshold signal 55 and the plausibility signal 65 are active simultaneously.

In an embodiment in which the second safety system is a VSC (vehicle stability control) system, the primary sensor for that system (which is the safing sensor for the airbag system) may need to measure only up to 2 G or 3 G of acceleration, and may need to have a sensitivity greater than the sensitivity of a higher-G accelerometer (such as a high-G accelerometer, or even a low-G accelerometer that has a higher specified range, such as a 10-G accelerometer). As such, that primary sensor may be an accelerometer specified to have a range of not more that 5 Gs for example. Accordingly, the primary sensor for the associated airbag system (a high-G accelerometer) will be safed by a safing sensor (the low-G accelerometer of the VSC system) with considerably lower range.

Some embodiments may integrate the output of one of the sensors (e.g., the primary sensor) over time, and compare that integrated output, or an time average of that sensor's output, with the output of another sensor (e.g., the safing sensor). Thus, the process of comparing one sensor output with another to safe the sensor may take a variety of forms.

Thus, each sensor safes the other sensor while supplying measurements for decision making on another safety system. The reliability of each sensor is thereby enhanced while reducing the number of components required, as compared with conventional systems.

While the evaluation circuit 100 is shown schematically in FIG. 2A as a monolithic device, the evaluation circuit may be spread across a plurality of circuit boards or integrated circuits, in various embodiments of the invention. Each or all of the circuit portions may be located in any location within the vehicle and the functions may be split among several locations within the vehicle. A sensor may be located on the same substrate as a portion of the evaluation circuit, in some embodiments. The evaluation circuit may include one or more microprocessors with attendant firmware and the evaluation circuit may employ various communication elements, e.g. fiber optics, time multiplex busses, RF, etc. to couple one portion of the circuit to another.

Figure 2B:
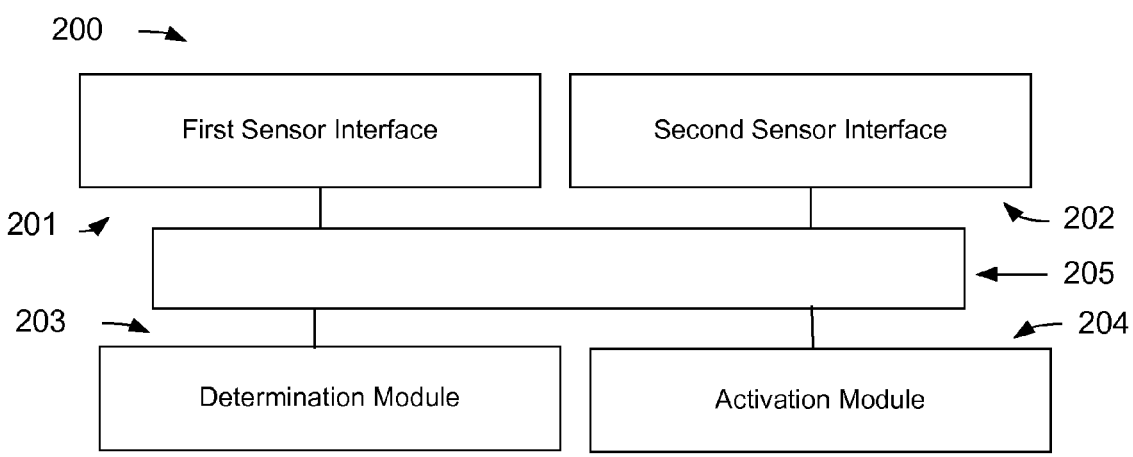
FIG. 2B is a schematic diagram of an evaluation circuit in modular form.

An modular illustration of a system's evaluation circuit 200 is schematically illustrated in FIG. 2B. A number of evaluation circuit modules 201, 202, 203, and 204 are interconnected with the sensors (not shown) via a communications network or bus, 205 which may carry analog and/or digital signals. A first sensor interface module 201 is operably coupled to a first sensor and receives the output of the first sensor, while a second sensor interface 202 is operably coupled to a second sensor and receives the output of the second sensor. Although illustrated as separate modules, some embodiments may combine these operations into a single module.

A determination module 203 processes the outputs of the first sensor and the second sensor and determines whether they exceed their respective thresholds, and generates a comparison signal including information relating to those determinations. If the comparison signal indicates that the outputs of the first sensor and the second sensor exceed their respective thresholds, an activation module 204 (which may also be known as a deployment module) activates a safety system. Although illustrated as a single module, some embodiments may have several such modules, for example, one determination module for each sensor, or for each threshold.

Figure 3:
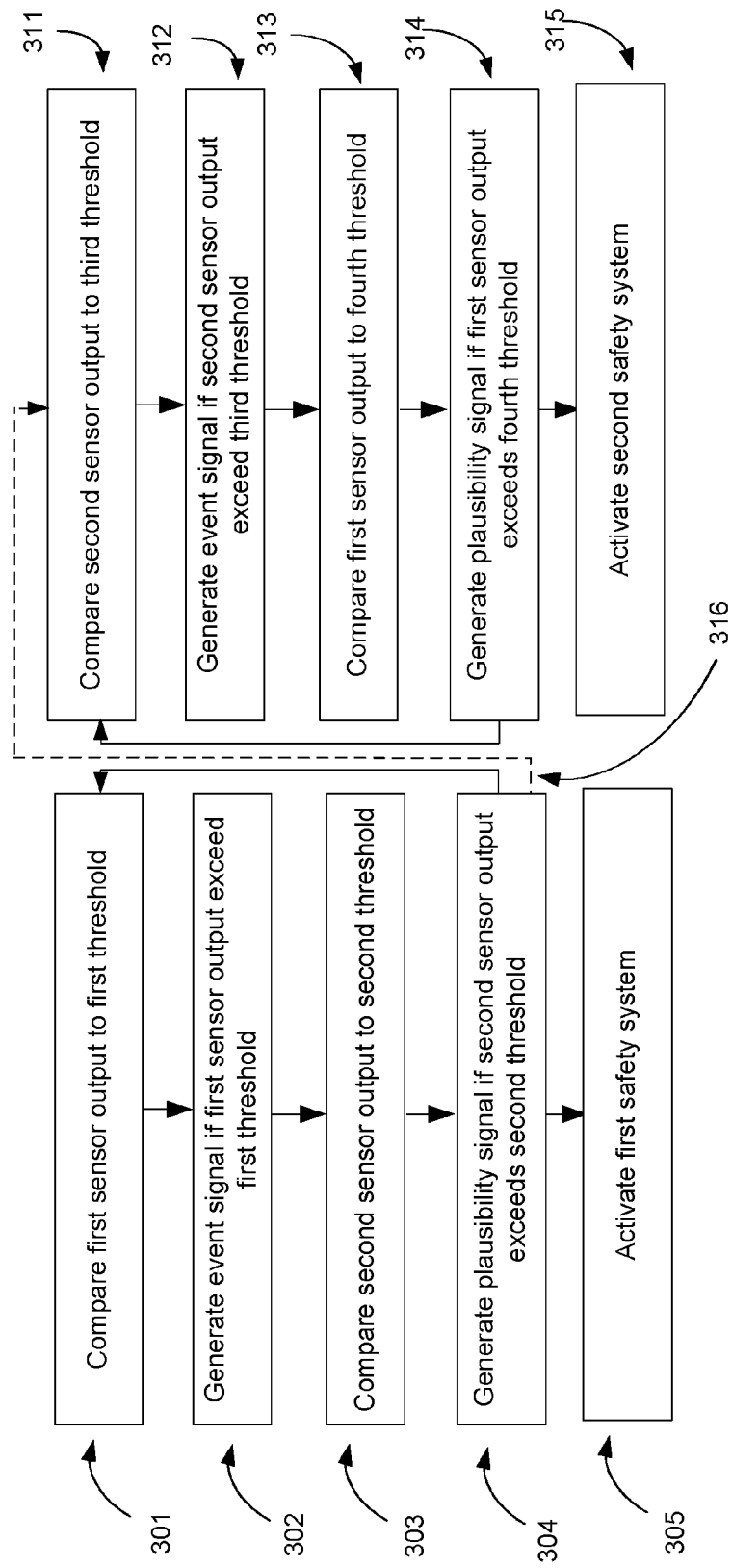
FIG. 3 is a flow chart schematically illustrating the operation of the device of FIG. 1.

The operation of an embodiment of such a system is summarized by the flow chart in FIG. 3. The process begins at step 301, which compares the output of the first sensor to a first threshold (step 3 If the output exceeds that threshold, then an event signal is generated (step 302). An event signal indicates that a sensor has sensed a condition or occurrence that meets the criteria for activating or triggering a safety system. The output of the second sensor is compared to a second threshold (step 303) and, if the output exceeds that threshold, then a plausibility signal is generated (step 304) to indicate that such an event is plausible. A signal to activate a first safety system is generated (step 305) only if both the event signal and the plausibility signal are active simultaneously. Otherwise, the process repeats.

Likewise, the output of the second sensor is compared to a third threshold (step 311) and, if the output exceeds that threshold, then a second event signal is generated (step 312). The output of the first sensor is compared to a fourth threshold (step 313) and, if the output exceeds that threshold, then a second plausibility signal is generated (step 314). A signal to activate a second safety system is generated (step 315) only if both the second event signal and the second plausibility signal are active simultaneously. Otherwise, the process repeats.

Although the steps of the methods of FIG. 3 are shown in parallel, they may also be performed in sequence, as indicated by the dashed line 316. If the second safety system is not activated at step 315, then the process may repeat starting from step 301.

As such, each sensor acts to activate a safety system (i.e., acts as a primary sensor), and also to safe the other sensor (i.e., acts as a safing sensor) to prevent erroneous activation of a safety system.

In addition to, or instead of, having two sensors safing each other as in the embodiments described above, some systems use the two sensors to monitor each other before a crash or other event. In various embodiments, a malfunctioning sensor may be detected before an event that meets the criteria for triggering or activating a safety system.

Figure 4:
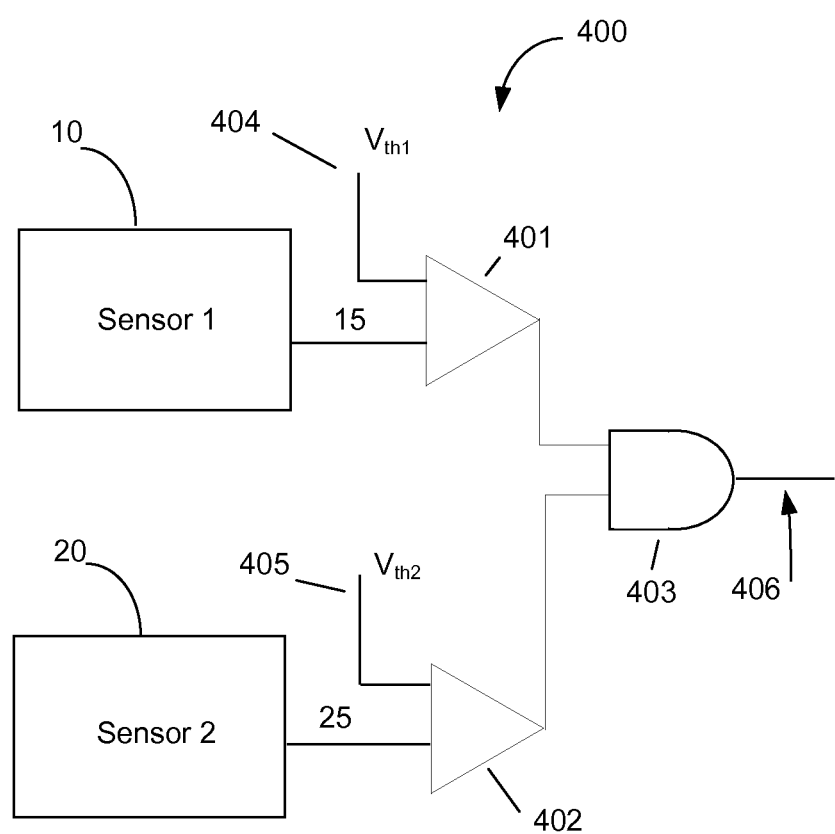
FIG. 4 is a schematic diagram of an embodiment of a vehicle safety system monitoring device, according to an embodiment.

In the system 400 of FIG. 4, a first comparator 401 monitors the output 15 of a first sensor 10, while a second comparator 402 monitors the output 25 of a second sensor 20. The first and second sensors respectively may be the first sensor 10 and second sensor 20 of the embodiment of FIG. 2A, but the thresholds do not correlate to a need to trigger a safety system. Rather, the thresholds 404 and 405 of the comparators 401 and 402 are set to a lower value, so as to monitor the sensors 10 and 20 and determine whether both sensors are producing a response to vehicle motion, even if that response is less than the threshold set to activate a safety system. If both sensors 10 and 20 are producing responses above the respective monitoring thresholds, then both sensors are sensing vehicle motion, and thus both are functioning, as indicated by the output 406 of AND gate 403. However, if one sensor is producing a response to vehicle motion and the other is not, then one of the sensors is in error and may be malfunctioning. In this way, a malfunctioning sensor may be detected before it is needed to activate a safety system or to safe another sensor.

During normal vehicle motion (i.e., motion that does not signal a need to activate, trigger or engage a safety system), sensor outputs may be much smaller than the activation thresholds discussed in connection with FIG. 2A. Accordingly, the thresholds in the embodiment of FIG. 4 are correspondingly lower. The magnitude of those thresholds will depend on the vehicle and expected normal vehicle motion. Depending on these thresholds, the comparators 401 and 402 may not detect the respective sensor outputs simultaneously or continuously. Accordingly, some embodiments may store the sensor outputs for a period of time, for example with a sample-and-hold amplifier or in a digital memory, to allow the respective sensor outputs to be processed at a later time. Alternately, some embodiments may store or latch the output of one or both of the comparators 401 and 402. Some embodiments may integrate the output of one of the sensors (e.g., the primary sensor) over time, and compare that integrated output, or an time average of that sensor's output, with the output of another sensor (e.g., the safing sensor). Thus, the process of comparing one sensor output with another to monitor the sensor may take a variety of forms.

The circuitry of FIG. 4 is illustrative only, and other embodiments may monitor the sensor outputs and determine whether the sensors are responding to vehicle motion using other circuits. For example, the sensor outputs could be digitized and analyzed in a microprocessor executing computer code provided for that purpose. In some embodiments, the plausibility circuit in a safing system as described above may also serve to monitor its associated sensor, and the monitoring threshold may even be the same as the plausibility threshold.

Figure 5:
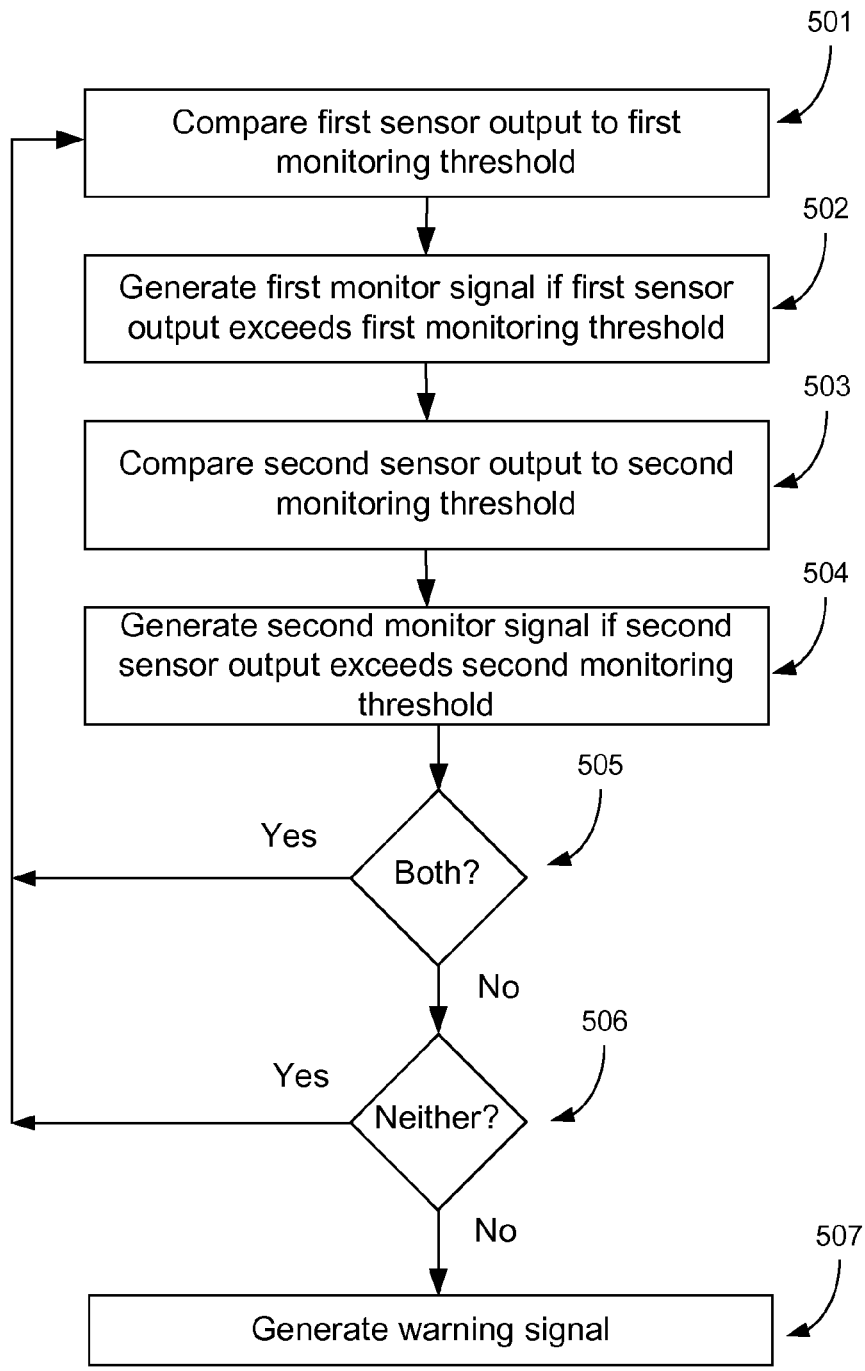
FIG. 5 is a flow chart schematically illustrating the operation of the device of FIG. 4.

The flow chart in FIG. 5 summarizes the operation of some such embodiments. First, the output of the first sensor is compared to a first threshold (step 501). If the output exceeds that threshold, then a first monitor signal is generated (step 502). Likewise, the output of the second sensor is compared to a second threshold (step 503) and if the output exceeds that threshold, then a second monitor signal is generated (step 504). If the first and second monitor signals indicate that both sensors are responding to vehicle motion, then the process repeats (step 505). If neither sensor is indicating vehicle motion, then the vehicle may be stationary, and the process repeats (step 506). However, if one sensor is indicating vehicle motion and the other is not, then one of the sensors may be malfunctioning, and an error signal or warning signal is generated (step 507). Such a warning signal may illuminate a light on the vehicle's dashboard, sound an audible alert, or log the error into the vehicle's computer system, for example.

Some vehicle safety systems require interaction among more than two sensors, and therefore may require multiple safing systems and methods. For example, a VSC (vehicle stability control) system can respond to a vehicle's rotation on the road, as when a vehicles spins. However, a VSC system operates not only on data about the vehicle's rotation, but also about its linear acceleration. As such, a VSC system may process data from a gyroscope and two accelerometers, for example.

Some embodiments of a VSC system, for example, may use three or more sensors to safe and/or monitor each other. Each sensor serves triple duty: it is the primary sensor for one safety system, and a safing sensor for two other safety systems. For example, in a VSC systems with a gyroscope and two accelerometers, the accelerometers may be the primary sensor for two airbag systems, and also serve as to safe each other and the gyroscope. Similarly, the gyroscope serves to safe each of the accelerometers, and the accelerometers safe each other. Thus, instead of a three systems each with two sensors (a primary sensor and a safing sensor), for a total of six sensors, some embodiments of a VSC systems may have only three sensors. This results not only in a savings in cost and weight, but also has fewer parts to fail.

Alternate embodiments may set or change various thresholds depending on the then-current operating parameters of the vehicle. For example, the expected sensor outputs, and therefore the thresholds, may differ depending on the speed of a vehicle, or as a function of the gear in which the vehicle is operating. Further, some embodiments may disable the safety system when the vehicle is not in gear.

Various embodiments may be implemented in software, e.g., computer program product. For example, a computer program product may include computer code stored in a nontransient manner on a computer readable medium, such as a CD-Rom or a semiconductor read-only memory. The product may include computer code for measuring vehicle motion with a high-G accelerometer while measuring vehicle motion with a low-G accelerometer; computer code for determining whether the high-G accelerometer's measurement exceeds the airbag deployment threshold; computer code for determining plausibility of the high-G accelerometer's measurement, using the low-G accelerometer's measurement, computer code for deploying the airbag if the high-G accelerometer's measurement exceeds the airbag deployment threshold and the high-G accelerometer's measurement has been determined to be plausible by the evaluation circuit using the low-G accelerometer's measurement, computer code for determining whether the low-G accelerometer's measurement exceeds the second deployment threshold, computer code for determining the plausibility of the low-G accelerometer's measurement using the high-G accelerometer's measurement, and computer code for triggering the second safety system when the low-G accelerometer's measurement exceeds the second deployment threshold and the low-G accelerometer's measurement has been determined to be plausible by the evaluation circuit using the high-G accelerometer's measurement. Various embodiments include code for implementing the various other methods described herein.

Accordingly, in various embodiments, sensors that monitor vehicle performance are themselves monitored to detect erroneous operation prior to an event that justifies activation of a safety system, and/or safe each other to prevent unjustified activation of a safety system in the absence of such an event. Making multiple use of each sensor reduces the weight, power consumption, part count and complexity of such safety systems, in addition to making such systems safer and more reliable.

Various embodiments of the invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer exec structure form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer execustructure form (e.g., via an interpreter), or the source code may be converted (e.g., via a translator, assembler, or compiler) into a computer executable structure form.

The computer program may be fixed in any form (e.g., source code form, computer execustructure form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The embodiments of the invention described above are intended to be merely exemplary; numerous variations and modifications will be apparent to those skilled in the art. All such variations and modifications are intended to be within the scope of the present invention as defined in the appended claims.

What is claimed is:

1. A method of operating a plurality of safety systems in a vehicle, the method comprising:
   providing a first safety system comprising:
      a first airbag, and characterized by a first airbag deployment threshold and a first plausibility threshold; and
      a high-G accelerometer configured to provide a high-G output and specified to measure at least about 20 Gs of acceleration and configured to act as a first-system primary sensor for the first safety system;
   providing a second safety system comprising:
      a second safety device selected from a group comprising a second airbag, a braking system, and a vehicle stability control system, the second safety device being characterized by a second deployment threshold; and
      a low-G accelerometer configured to provide a low-G output, and specified to measure not more than about 20 Gs and configured to act as a second-system primary sensor for the second safety system and as a safing sensor for the first safety system;
   monitoring a motion of the vehicle with the high-G accelerometer to determine whether the high-G output exceeds the airbag deployment threshold;
   monitoring the same motion of the vehicle with the low-G accelerometer to determine whether the low-G output exceeds the first plausibility threshold; and
   deploying the first airbag if the high-G output exceeds the first airbag deployment threshold and the low-G output exceeds the first plausibility threshold.

2. A method of operating a plurality of safety systems in a vehicle according to claim 1, wherein:
   the second safety system is characterized by a second plausibility threshold, and the method further comprises:
   determining whether the low-G accelerometer's measurement exceeds the second deployment threshold;
   determining whether the high-G accelerometer's measurement exceeds the second plausibility threshold; and
   deploying the second safety system if low-G accelerometer's measurement exceeds the second deployment threshold and the high-G accelerometer's measurement exceeds the second plausibility threshold such that the high-G accelerometer is configured as a safing sensor for the second safety system.

3. A method of operating a plurality of safety systems in a vehicle according to claim 1, wherein the second safety system is a vehicle stability control system.

4. A method of operating a plurality of safety systems in a vehicle according to claim 1, wherein the second safety system is a braking system.

5. A computer program product for use with a computer processor for operating an airbag safety system and a second safety system on a vehicle, the airbag safety system characterized by an airbag deployment threshold and an airbag plausibility threshold, and comprising an airbag and a high-G accelerometer associated with the airbag deployment threshold, the high-G accelerometer specified to measure at least about 20 Gs of acceleration, the second safety system being characterized by a second deployment threshold and a second plausibility threshold, and comprising a low-G accelerometer associated with a second deployment threshold, the low-G accelerometer specified to measure not more than about 20 Gs and configured to act as a safing sensor for the airbag safety system, the computer program product comprising a tangible medium having a non-transient computer readable program code thereon, the computer readable program code including:
   computer code for monitoring an output of the high-G accelerometer in response to a vehicle motion event to determine whether the output of the high-G accelerometer exceeds the airbag deployment threshold;
   computer code for monitoring an output of the low-G accelerometer in response to the same vehicle motion event to determine whether the output of the low-G accelerometer exceeds the airbag plausibility threshold such that the low-G accelerometer is a safing sensor for the high-G accelerometer; and
   computer code for deploying the airbag if the output of the high-G accelerometer exceeds the airbag threshold and the output of the low-G accelerometer exceeds the airbag plausibility threshold.

6. The computer program product according to claim 5, further comprising:
    computer code for monitoring the output of the low-G accelerometer in response to a vehicle motion event to determine whether the output of the low-G accelerometer exceeds the second deployment threshold;
    computer code for monitoring the output of the high-G accelerometer to determine whether the output of the high-G accelerometer exceeds the second plausibility threshold such that the high-G accelerometer is a safin sensor for the low-G accelerometer; and
    computer code for deploying the second safety system if the output of the low-G accelerometer exceeds the second deployment threshold and the output of the high-G accelerometer exceeds the second plausibility threshold.

7. The computer program product according to claim 5, wherein the second safety system is a vehicle stability control system.

8. The computer program product according to claim 5, wherein the second safety system is a braking system.

9. The computer program product according to claim 5 wherein the code determines whether the output of the low-G accelerometer exceeds the airbag plausibility threshold after the code determines whether the output of the high-G accelerometer exceeds the airbag deployment threshold.

10. A vehicle safety apparatus comprising:
    a first safety system comprising:
        a first airbag, and characterized by a first airbag deployment threshold and a first plausibility threshold; and
        a high-G accelerometer having a high-G output, the high-G accelerometer specified to measure at least about 20 Gs of acceleration and configured to act as a first-system primary sensor for the first safety system;
    a second safety system comprising:
        a second safety device selected from a group comprising a second airbag, a braking system, and a vehicle stability control system, the second safety device being characterized by a second deployment threshold; and
        a low-G accelerometer having a low-G output, the low-G accelerometer specified to measure not more than about 20 Gs and configured to act as a second-system primary sensor for the second safety system and as a safing sensor for the first safety system;
    a comparison circuit, the comparison circuit configured:
        to determine whether the high-G output exceeds the airbag deployment threshold, and to determine whether the low-G output exceeds the airbag plausibility threshold, the comparison circuit producing a comparison signal including information relating to the determinations; and
    a deployment module operably coupled with the comparison circuit and configured to deploy the airbag system if the comparison signal indicates that the high-G output exceeds the airbag deployment threshold and the low-G output exceeds the airbag plausibility threshold.

11. The apparatus according to claim 10 wherein the second safety system is characterized by a second plausibility threshold, and the comparison circuit is further configured to
    determine whether the low-G output exceeds the second deployment threshold; and
    determine whether the high-G output exceeds the second plausibility threshold; and the deployment module is configured to deploy the second safety system if the low-G output exceeds the second deployment threshold and the high-G output exceeds the second plausibility threshold
    such that the high-G accelerometer is configured as a safing sensor for the second safety system.

12. The apparatus according to claim 10 wherein the first safety systems is a passenger restraint system and the second safety system is a vehicle braking system.

13. A method of operating a plurality of safety systems in a vehicle, the method comprising:
    providing a first safety system comprising:
        a first airbag, and characterized by a first airbag deployment threshold and a first plausibility threshold; and
        a high-G accelerometer configured to provide a high-G output and specified to measure at least about 20 Gs of acceleration and configured to act as a first-system primary sensor for the first safety system;
    providing a second safety system comprising:
        a second safety device selected from a group comprising a second airbag, a braking system, and a vehicle stability control system, the second safety device being characterized by a second deployment threshold; and
        a gyroscope configured to provide a gyro output, and configured to act as a second-system primary sensor for the second safety system and as a safing sensor for the first safety system;
    monitoring a motion of the vehicle with the high-G accelerometer to determine whether the high-G output exceeds the airbag deployment threshold;
    monitoring the same motion of the vehicle with the gyrosocope to determine whether the gyro output exceeds the first plausibility threshold; and
    deploying the first airbag if the high-G output exceeds the first airbag deployment threshold and the gyro output exceeds the first plausibility threshold, such that the gyroscope is configured to act as a safing sensor for the first safety system.

14. The method of operating a plurality of safety systems in a vehicle according to claim 13, wherein the second safety system is a vehicle stability control system.

15. The method of operating a plurality of safety systems in a vehicle according to claim 13, wherein the second safety system is a braking system.

* * * * *

UNITED STATES PATENT AND TRADEMARK OFFICE
CERTIFICATE OF CORRECTION

| | | |
|---|---|---|
| PATENT NO. | : 8,633,828 B2 | Page 1 of 1 |
| APPLICATION NO. | : 13/019050 | |
| DATED | : January 21, 2014 | |
| INVENTOR(S) | : Maxim Liberman | |

It is certified that error appears in the above-identified patent and that said Letters Patent is hereby corrected as shown below:

In the claims:

In Col. 13, line 10
replace "safin"
with --safing--

Signed and Sealed this
Twenty-seventh Day of May, 2014

Michelle K. Lee
*Deputy Director of the United States Patent and Trademark Office*